United States Patent
Nicu et al.

(10) Patent No.: US 7,210,347 B2
(45) Date of Patent: May 1, 2007

(54) MICROMACHINED INERTIAL SENSOR FOR MEASURING ROTATIONAL MOVEMENTS

(75) Inventors: Liviu Nicu, La Roche de Glun (FR); Claude Rougeot, Lyons (FR); Jérôme Inglese, Valence (FR); Bertrand Leverrier, Montelier (FR); Pierre-Olivier Lefort, Valence (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 10/497,658

(22) PCT Filed: Dec. 10, 2002

(86) PCT No.: PCT/FR02/04273

§ 371 (c)(1),
(2), (4) Date: Jun. 4, 2004

(87) PCT Pub. No.: WO03/054477

PCT Pub. Date: Jul. 3, 2003

(65) Prior Publication Data

US 2004/0250620 A1 Dec. 16, 2004

(30) Foreign Application Priority Data

Dec. 20, 2001 (FR) .................... 01 16555

(51) Int. Cl.
*G01C 19/00* (2006.01)
(52) U.S. Cl. .................................. 73/504.12
(58) Field of Classification Search ............ 73/504.14, 73/504.12, 504.02, 504.04, 514.29, 514.38, 73/514.32; 438/17, 22; 361/280
See application file for complete search history.

(56) References Cited

U.S. PATENT DOCUMENTS

| 5,635,638 | A | 6/1997 | Geen ........................ 73/504.04 |
| 6,089,093 | A | 7/2000 | Lefort et al. ............. 73/514.33 |
| 6,214,243 | B1* | 4/2001 | Muenzel et al. ......... 73/504.12 |
| 6,230,563 | B1* | 5/2001 | Clark et al. .............. 73/504.04 |
| 6,250,156 | B1* | 6/2001 | Seshia et al. ............ 73/504.12 |
| 6,251,698 | B1 | 6/2001 | Lefort et al. .................. 438/22 |
| 6,257,059 | B1 | 7/2001 | Petrovich et al. ........ 73/504.16 |
| 6,311,556 | B1 | 11/2001 | Lefort et al. ............. 73/514.29 |
| 6,467,348 | B1* | 10/2002 | Song et al. .............. 73/504.12 |
| 6,546,801 | B2 | 4/2003 | Orsier et al. ............. 73/514.38 |

FOREIGN PATENT DOCUMENTS

EP  1 098 170  5/2001

* cited by examiner

*Primary Examiner*—Hezron Williams
*Assistant Examiner*—Tamiko Bellamy
(74) *Attorney, Agent, or Firm*—Lowe Hauptman & Berner, LLP

(57) ABSTRACT

The invention relates to gyroscopes having a vibrating structure that is micromachined in a silicon substrate. A novel vibrating structure is described, which has two moving masses 14 and 14', connected by a vibration energy coupling structure (transverse arms 26, 26', longitudinal arms 22, 22', and a short transverse link 24 between the longitudinal links 22, 22'). The moving masses are also suspended from U-shaped flexure arms (13), having one branch end connected to the mass and another end connected to a fixed anchoring point 18. The flexure arms are not inserted between the coupling structure and the mass, but are independent of the coupling structure. The masses are excited so as to vibrate in their plane by electrostatic forces applied by interdigitated combs 11. The Coriolis forces make them vibrate perpendicular to the plane, and this vibration is detected by electrodes forming part of the moving masses.

11 Claims, 6 Drawing Sheets

PRIOR ART

MICROMACHINED INERTIAL SENSOR FOR MEASURING ROTATIONAL MOVEMENTS

CROSS-REFERENCE TO RELATED APPLICATIONS

The present Application is based on International Application No. PCT/FR02/04273, filed on Dec. 10, 2002, entitled "MICROMACHINED INERTIAL SENSOR FOR MEASURING ROTATIONAL MOVEMENTS", which in turn corresponds to French Application FR 01/16555 filed on Dec. 20, 2001, and priority is hereby claimed under 35 U.S.C. 119 based on these applications. Each of these applications are hereby incorporated by reference in their entirety into this application.

FIELD OF THE INVENTION

The invention relates to inertial sensors intended for measuring angular velocities, or gyroscopes, and more precisely to gyroscopes that are micromachined using the technologies of etching, deposition, doping, etc., these being similar to those used in the field of integrated electronic circuits.

BACKGROUND OF THE INVENTION

The use of micromachined inertial sensors has entered a continual growth phase, especially in the fields of aeronautics, automobiles and robotics, and in yet other fields, thanks to the fact that at the present time these microsensors combine their robustness with advantages associated with their extremely small size. To this should be added the fact that these microsensors can be fabricated collectively (the fabrication operations are carried out on entire wafers comprising numerous sensors that are subsequently divided into individual sensors), which makes the fabrication cost competitive with the prior devices.

Such sensors, produced on silicon wafers, are already known, the fabrication comprising especially boron diffusion and dry anisotropic etching operations for defining precise dimensions of the elements of the structure. Overall, the structure is planar, lying in the plane of the silicon substrate in which it is etched.

The structure of a gyroscope thus produced typically comprises two moving masses that are excited in vibration and connected as a tuning fork, that is to say the two masses are connected to a central coupling structure that transfers the vibration energy from the first mass to the second mass, and vice versa.

The masses are excited into vibration in the plane of the structure by electrostatic forces applied by means of combs of interdigitated electrodes. This vibration in the plane of the structure is exerted perpendicular to an axis called the "sensitive axis" of the gyroscope, which is an axis of symmetry of the tuning-fork structure. When the gyroscope rotates at a certain angular velocity about its sensitive axis, the composition of the force vibration together with the angular rotation vector generates, by the Coriolis effect, forces that set the moving masses into natural vibration perpendicular to the plane of the structure.

The vibration perpendicular to the plane is detected capacitively by electrodes placed above the moving masses. The electrical signals that result therefrom are used to deduce from them a value of the angular velocity about the sensitive axis.

In the prior art, relatively complex structures have been proposed.

To obtain a gyroscope with sufficient sensitivity, that is to say with an ability to detect low rotation velocities, it is necessary for the amplitude of the excited vibration in the plane of the moving masses to be large (compared with the dimensions of the flexure arms that support them). However, a high vibration amplitude generates substantial elastic forces and therefore substantial deformation potential energies. This has the immediate effect of causing nonlinear phenomena to appear in the dynamic deformation characteristics of the structure. The mechanical resonance frequency of the system becomes highly dependent on the amplitude of the movement, a situation that is difficult to accept.

The existing structures generally comprise a moving mass supported by flexure arms clamped to the moving mass, each arm being, on the other side, itself supported (again clamped) in the coupling structure with the other moving mass. In such structures, it has also been sought to attenuate the flexure arm deformation effects by establishing articulated links rather than clamped links between the flexure arms and the moving mass or between the flexure arms and the inter-mass coupling structure. However, these improvements lower the quality of the mechanical coupling between moving masses, degrading the Q of the mechanical resonance of the excited structure. In particular, this poor coupling results in an insufficient frequency difference (of the order of a few tens of hertz) between the useful vibration modes (in phase opposition) of the masses, and the parasitic (in-phase) vibration modes of the same masses.

Hybrid structures have also been proposed (U.S. Pat. No. 5,635,638) in which the moving masses are supported by flexure arms acting both as flexure arms for supporting the moving mass and for defining (via their stiffness) the natural resonant frequency of the masses and also acting as a coupling structure for coupling with the other moving mass in order to promote the anti-phase movement of the two masses. However, the drawback of these structures is the difficult design, owing to the twin roles of these hybrid arms. There is not sufficient independence between the two flexible suspension functions (parallel and perpendicular to the plane of the masses) and the role of coupling mechanical energy between the masses. As a result, there is a high risk of deformation of the structure during vibrations. Here again, there is a risk of nonlinear phenomena, and it is particularly difficult to choose the flexibility characteristics of the arms in order to achieve the desired performance criteria.

SUMMARY OF THE INVENTION

It is an object of the invention to improve the behavior of the gyroscope without degrading its performance as regards sensitivity, nor its fabrication cost.

For this purpose, the invention proposes to make the inter-mass vibration coupling structure as independent as possible from the flexure arms that support the moving mass. In other words, the flexure arms are no longer inserted between the coupling structure and the moving masses, or else the masses are no longer attached to the coupling structure by means of the flexure arms that provide the elastic return of the vibrating masses (return both in the direction of in-plane vibration and in the direction of vibration perpendicular to the plane).

Quite to the contrary, the coupling structure is connected directly to the moving masses via elements that do not fulfill the essential function of flexure arms, namely a flexible support function for the moving mass (flexibility in the plane and perpendicular to the plane of the masses), these supports having a stiffness that defines, without any appreciable effect on the presence of the coupling structure, the resonant frequency of the masses; the flexure arms are also connected to the moving masses, but independently of the coupling structure. In order for the resonant frequency of the masses to be little affected by the presence of the coupling structure, provision is made for the stiffness of the coupling structure (in the in-plane direction of excited vibration of the mass) to be very different from the stiffness of the flexure arms (in practice, the stiffness of the coupling structure will be much less than that of the flexure arms).

More precisely, the invention consequently proposes a micromachine gyroscope having a plane moving structure anchored to a fixed substrate, the moving structure being symmetrical about a first axis, called the sensitive axis, lying in this plane, the structure comprising two moving masses that are attached to flexure arms, the stiffness of which defines the main resonant frequency of the masses, a structure for exciting the vibration of each mass in the plane of the structure, a structure for detecting a vibration of the masses transverse to the plane, and a mechanical coupling structure for connecting the masses together, ensuring that mechanical vibration energy is transferred from one mass to the other, this gyroscope being characterized in that the flexure arms connected to a moving mass are connected also to at least one fixed anchoring point, the inter-mass coupling structure being connected directly to the moving masses independently of the flexure arms and this coupling structure having a stiffness (in the direction of excitation of the vibration and in the direction of detection of a vibration) that is appreciably different from the stiffness of the flexure arms so that the main resonant frequency of the masses depends only slightly on the stiffness of the coupling structure.

Preferably, each moving mass is connected to the coupling structure at only two points that lie along an axis of symmetry of the moving mass parallel to the sensitive axis.

Preferably, the flexure arms are each folded in the form of a U, the end of one branch of the U being attached to the moving mass and the end of the other branch being connected to said fixed anchoring point of the substrate.

The configuration of the assembly comprising the moving masses and the flexure arms is preferably symmetrical with respect to a second axis (the first being the sensitive axis), parallel to the sensitive axis. It is also preferably symmetrical with respect to a third axis that is perpendicular to the sensitive axis. Each mass is then connected to four flexure arms in a configuration that is symmetrical with respect to a center of gravity of the moving mass, at the intersection of the second and third axes.

In a preferred configuration, each moving mass is connected via its flexure arms to a single respective anchoring point of the fixed substrate, located at this center of gravity or the center of symmetry of the moving mass. The flexure arms are located within the perimeter of the mass.

In another configuration, the flexure arms are anchored to the fixed substrate not at a single point at the centre of the mass, but at two anchoring points or even four anchoring points, on either side of said mass. The flexure arms are located outside the perimeter of the mass, near its center; the plate constituting the moving mass is cut at its center in order to make room for the anchoring point and the flexure arms.

The structure for coupling the vibrating mechanical energy, which connects the two moving masses, is prefer-ably not anchored to the substrate. However, in an alternative embodiment it may be so.

This coupling structure preferably comprises at least two longitudinal links extending on either side of the sensitive axis, parallel to the latter, between the moving masses, at least one transverse link connecting between them the two longitudinal links, and at least two transverse arms connecting each moving mass to a respective longitudinal link, the latter two transverse arms being located on either side of the moving mass and connected to the mass at two opposed attachment points. The stiffness of the transverse arms in the direction of the excited vibration of the masses is low compared with the stiffness of the flexure arms in the same direction.

BRIEF DESCRIPTION OF THE DRAWINGS

Other features and advantages of the invention will become apparent on reading the detailed description that follows, given with reference to the appended drawings in which.

DETAILED DESCRIPTION OF THE INVENTION

Figure 1:
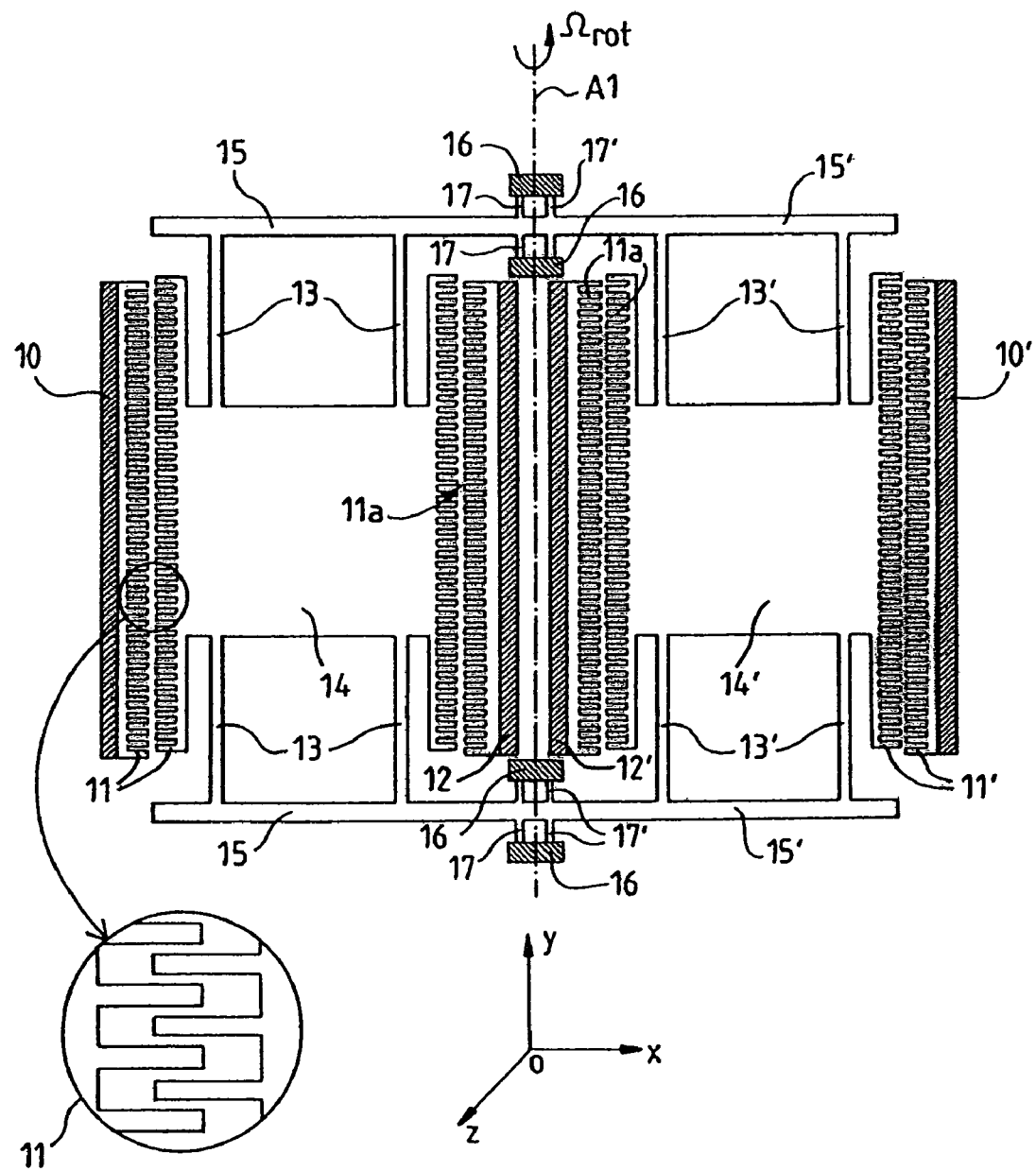
FIG. 1 shows a gyroscope structure of prior design.

FIG. 1 shows the general principle of a gyroscope that the present invention aims to improve upon.

We will not enter into all the details of fabricating a micromachined gyroscope, given that the fabrication principles have been known for several years and the invention is based on the design of the mechanical structure to be produced, and not in the manner of producing it.

It will be merely recalled that a gyroscope can be produced from a superposition of three micromachined substrates, which may be three silicon substrates. The first and third substrates serve as a cover for a closed chamber in which a vacuum is preferably created, whereas the second substrate, or intermediate substrate, is machined into the patterns that will be described later, in order to produce a vibrating structure with moving masses and support arms having the desired mechanical properties. The first substrate may also serve to inject, into the second substrate, electric currents for exciting the vibrating structure parallel to the plane of the substrates, whereas the third substrate, thanks to electrodes placed opposite the moving masses of the intermediate substrate, may act as supports for the circuits that detect the vibration of the moving masses perpendicular to the plane of the substrates.

The first and third substrates may therefore be produced using microelectronics techniques, involving diffusion operations, operations of depositing metal layers, operations of etching these layers, and also possibly deep substrate etching operations, for the purpose of forming separating spaces between the intermediate substrate and the first or third substrate, in order to make room for movements of the structure machined in the intermediate substrate. The intermediate substrate itself is also produced by operations of this type, but in addition, given that its main function is mechanical, it is produced by deep etching operations for the purpose of cutting out a micromechanical structure with very fine features and with a very small thickness, the details of which will be entered into later on.

Typically, the intermediate substrate is a silicon-on-insulator (SOI) substrate with a thickness of a few hundred microns, but this thickness will be preserved only at points, called anchoring points, for anchoring the vibrating structure, and also around the periphery of the structure along a frame that surrounds the vacuum chamber containing the vibrating structure. These anchoring points or regions connect the intermediate substrate to the other two substrates and are therefore integral with the fixed, nonvibrating, body of the gyroscope. The remainder of the intermediate substrate has a much smaller thickness, for example around sixty microns, and constitutes the actual vibrating structure connected to the body via the anchoring points. The thin silicon structure is cut into the desired moving mass features, flexure arms and coupling structures.

Typically, the thinning of the structure may be accomplished using, as intermediate substrate, a silicon-on-insulator substrate, but other methods are also possible. A silicon-on-insulator substrate consists of a silicon substrate having a thickness of a few hundred microns, which bears, on its front face, a thin layer of silicon oxide itself covered with a layer of single-crystal silicon a few tens of microns in thickness. The thinning operation consists in etching the silicon of the substrate via its front face until the oxide layer is reached, using a selective etchant which etches the silicon without significantly etching the oxide. The etching is stopped when the oxide layer is exposed. This oxide layer may itself be removed, beneath the silicon layer, via holes distributed around the surface, by selective etching using another etchant so as to preserve only the silicon surface layer. The oxide layer remains in the anchoring regions and forms a fixed link between the silicon surface layer and the thick substrate.

It is therefore these surface patterns that will now be described with reference to FIGS. 1 to 6. They determine the mechanical properties of the gyroscope.

FIG. 1 (a prior design) shows that the general arrangement of the plane vibrating structure is symmetrical with respect to a first axis A1, which is the sensitive axis of the gyroscope (the axis oriented in the direction Oy in the orthogonal reference frame of FIG. 1). The gyroscope delivers an electrical measurement of the angular rotation velocity of the structure about this sensitive axis A1. For example, if the gyroscope is set up in an aircraft so as to have its axis A1 along the longitudinal axis of the aircraft, the gyroscope will measure aircraft roll rates.

Since the vibrating plane structure is symmetrical, the same reference number but with a "prime" index, is used to the right of the axis A1 to denote an element that is symmetrical with an element in the left-hand portion. The explanation will be given in general with regard to the left-hand portion and will not be repeated with regard to the right-hand portion except when this is necessary.

The plane structure comprises two moving masses that vibrate, denoted by 14, 14'. Each mass is supported by four flexure arms 13 which are also attached to transverse arms 15, 15' that connect the right-hand and left-hand symmetrical portions of the structure.

In the outermost region of the structure, that is to say in that part furthest away from the sensitive axis A1, there is an interdigitated comb 11 serving to excite a vibration in the moving mass in the plane of the structure (along the direction Ox relative to the orthogonal reference frame indicated in the figure). The excitation comb 11 comprises two facing half-combs, one supported by the moving mass and the other anchored by an anchoring base 10 to the gyroscope body. The fingers of one of the half-combs are electrodes that penetrate into the gaps between the electrode-fingers of the other half-comb. The application of AC voltages between the half-combs, at a frequency close or equal to the mechanical resonance frequency of the structure, causes the moving mass to vibrate in the plane of the structure.

The half-combs are shown schematically in all the figures as if they were juxtaposed, but it should be understood that there is interpenetration as indicated in the circled detail shown in FIG. 1.

Inside the vibrating structure, that is to say near the sensitive axis, another, optional, interdigitated comb 11a is provided with a half-comb supported by the moving mass and a half-comb anchored by an anchoring base 12 to the gyroscope body. This comb serves for detecting the vibration of the mass in the plane of the structure. Such detection is advantageous as it allows the frequency and the amplitude of excitation of the external comb 11 to be electronically controlled in order to adjust it to the mechanical resonance frequency of the structure. The amplitude of the vibration must be maximized in order to increase the sensitivity of the gyroscope, and this maximization assumes that the excitation frequency is well tuned to the mechanical resonance frequency.

The flexure arms 13 support the moving mass, permitting an in-plane excited vibration movement of relatively large amplitude (a few microns), hence their closeness. For example, they have a width of 40 microns for a length of around one millimeter. They must also permit a vibration movement of the mass perpendicular to the plane since it is this movement that it is desired to detect. They act as return springs for these two movements and their stiffness must be sufficient to exert this return force. The flexure arms may, from a mechanical standpoint, be regarded as flexible beams anchored in the moving mass on one side, and in the transverse arms 15, 15' on the other (on either side of the moving mass).

The transverse arms 15, 15' constitute the structure for mechanical coupling between the two moving masses 14, 14'. They serve to transmit vibration energy from one mass to the other, in the same way that one arm of a musical tuning fork, struck so as to set it in vibration, automatically causes, by coupling mechanical energy through the base of the tuning fork, the other branch to vibrate. This coupling is useful for making the two moving masses vibrate in phase, knowing that it is difficult to precisely synchronize these phases by the purely electrical means that the excitation combs constitute.

The coupling structure shown in FIG. 1 therefore comprises two groups of transverse arms that pass through the entire structure perpendicular to the sensitive axis, on each side of the moving mass.

Throughout the following text, the term "transverse" will be used to denote orientations perpendicular to the sensitive axis (in the plane of the structure) and the term "longitudinal" will be used for orientations parallel to the sensitive axis.

Given that the vibrating plane structure cannot "float" relative to the gyroscope body, it has to be anchored at points that disturb neither the vibration of the masses nor the transmission of mechanical energy between the masses. This is why, near the sensitive axis, the coupling structure is supported by torsion bars 17, 17' fastened to anchoring bases 16. These torsion bars permit the transverse arms 15 to rotate about the sensitive axis, without preventing transverse transmission of the mechanical energy between the vibrating masses.

To complete the description of the gyroscope shown in FIG. 1, it should be pointed out that the moving masses preferably carry electrodes (not shown) which face corresponding electrodes on the first substrate and/or the third substrate of the gyroscope. The out-of-plane vibration of the masses owing to the effect of the Coriolis forces (Oz direction, that has to be taken as perpendicular to the plane of the paper, in the reference frame shown in FIG. 1) is detected capacitively by these electrodes. Moreover, provision may be made for this purpose for there to be, on the one hand, actual detection electrodes and, on the other hand, feedback electrodes via which the vibration movement generated by the Coriolis forces is servocontrolled, the gyroscopic measurement then being determined by measuring the servocontrol signals that are needed to oppose the movement of the masses.

The gyroscope structure thus described has drawbacks owing to nonlinear phenomena that the present invention aims to minimize.

Figure 2:
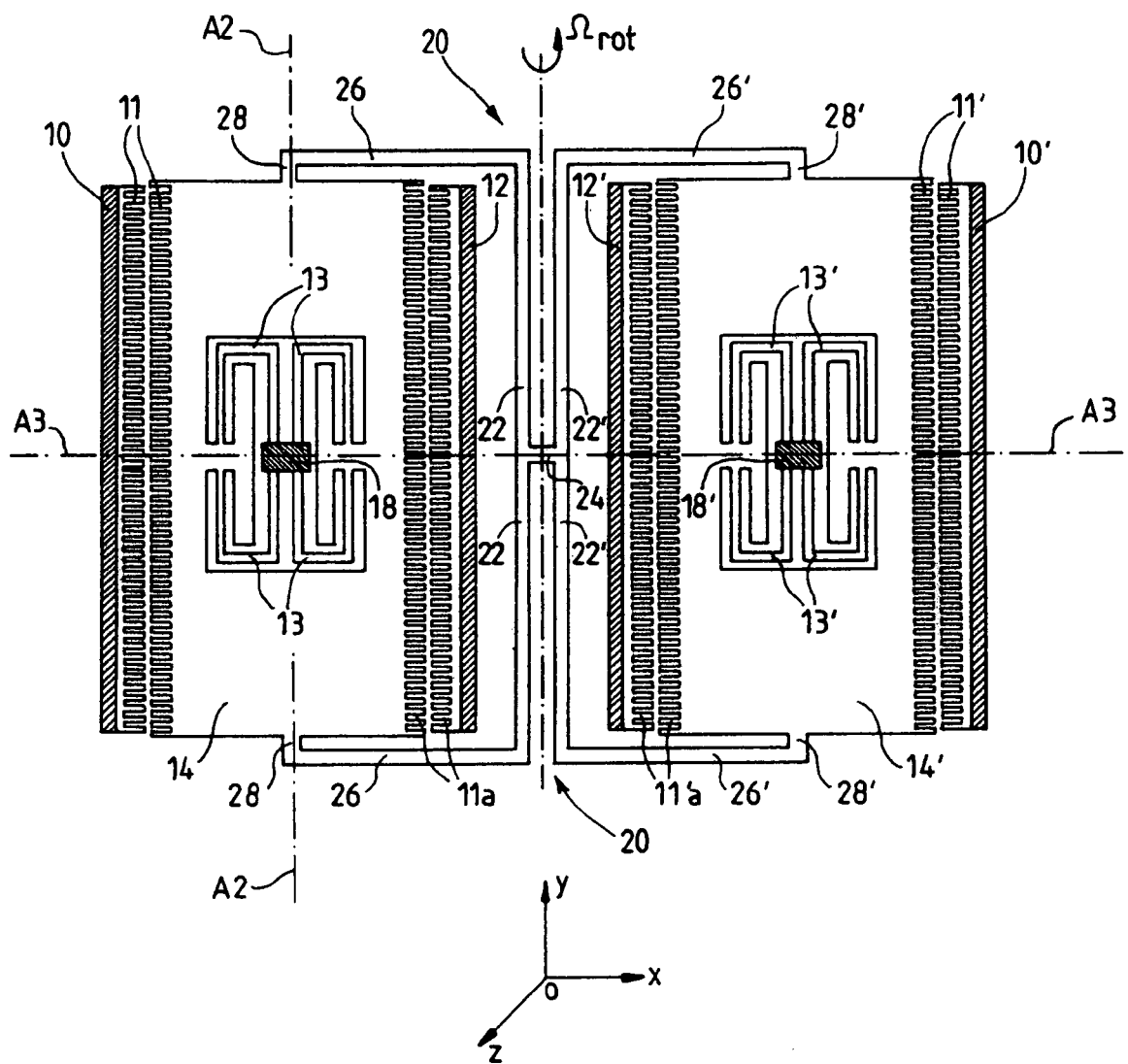
FIG. 2 shows a gyroscope structure according to the invention.

FIG. 2 shows, in a preferred embodiment, the principle of the invention. In this figure, and in the following figures, the elements that correspond functionally to those of FIG. 1 are denoted by the same reference numbers.

Instead of the moving masses 14 being suspended from flexure arms that are themselves attached to the inter-mass coupling structure, independence is established between the flexure arms 13 and the coupling structure, denoted here by 20, namely the flexure arms 13 are attached to the moving mass on one side, and to a fixed anchoring base on the other; the coupling structure is attached directly to the moving mass without passing via the flexure arms. The coupling structure does not constitute by itself flexure arms for supporting the moving mass with a stiffness designed to give a chosen main resonant frequency.

In the case of FIG. 2, the coupling structure 20 is not fastened, either directly or indirectly, to an anchoring base, whereas in FIG. 1 it was fastened, indirectly via the torsion arms 17, to the anchoring bases 16.

Moreover, the flexure arms 13 each preferably have a folded shape in the form of a U. One of the branches of the U is fastened, at its end, to the anchoring base, the other branch being fastened, at its end, to the moving mass 14. The branches are oriented longitudinally, that is to say parallel to the sensitive axis.

There are four flexure arms 13 for each moving mass. The combination of the moving mass and of the four flexure arms is preferably formed symmetrically with respect to a second axis A2, which is parallel to the sensitive axis A1. In practice, a combination of the moving mass and the four flexure arms is also symmetrical with respect to a third axis A3, perpendicular to the sensitive axis A1.

The anchoring base, denoted by 18 in FIG. 2, is then preferably common to the four flexure arms and it is located at the center of gravity of the moving mass, which is itself located at the intersection of the axes of symmetry A2 and A3.

While the thinned silicon wafer is being etched, a space is therefore reserved at the center of the moving mass in order to cut out the four U-shaped flexure arms thereat, the actual moving mass surrounding these four arms and the anchoring base 18.

Here again, the link between the flexure arms and the moving mass, or between the flexure arms and the anchoring point, is of the "clamped beam" type.

The use of folded arms as flexure arms helps to overcome the effects of nonlinearities, thanks to the very great mechanical flexibility specific to this shape, both in the plane and perpendicular to the plane. These arms allow any intrinsic stresses in the constituent materials to be relaxed.

The inter-mass coupling structure shown in FIG. 2 has essentially the shape of a H with two longitudinal links 22, 22', a transverse link 24 between the longitudinal links, and elements for attaching the masses to the end of the longitudinal links, the attachment elements being denoted by 26, 28 in the case of the first mass and 26', 28' in the case of the second.

More precisely, the longitudinal links 22, 22' extend along the sensitive axis, in the immediate vicinity of the latter, over the entire length of the moving masses. A short transverse link 24 connects them together. This link is preferably along the transverse axis of symmetry A3. All the mechanical vibration energy of the masses passes through this transverse link 24, which acts as the base of a tuning fork, but this base is not anchored to the gyroscope body.

At the end of the longitudinal link 22, on either side of the moving mass, that is to say on either side of the transverse axis of symmetry A3, there are the elements for attaching the mass. These elements comprise, above the mass 14 and below it, a transverse arm 26 on each side of the mass, and a short longitudinal arm 28 for attachment between the mass and the transverse arm 26. The short longitudinal arms 28 preferably lie along the second longitudinal axis of symmetry A2. However, the moving mass could if necessary be attached at two points on each transverse arm 26 via two short longitudinal arms 28 symmetrical with respect to the axis A2.

The longitudinal arms 28 can flex along the Ox direction and they flex in the Oz direction perpendicular to the plane. Their stiffness in these directions is substantially less than the stiffness of the flexure arms 13 in the same directions, so that the main resonant frequency of the vibrating masses is determined almost exclusively by the stiffness of the flexure arms 13 and very little by the stiffness of the arms 22. When added to the fact that the coupling structure is attached to each mass along the axis of symmetry A2 of the mass, this means that any distortion of the structure during the vibration is limited. The main resonant frequency is the natural vibration frequency of the mass, as close as possible to which frequency a vibration of the mass along the Ox axis will be electrostatically excited.

Of course, the attachment elements 26', 28' for the other moving mass to the end of the longitudinal links 22' are strictly symmetrical with the elements 26, 28.

Figure 3:
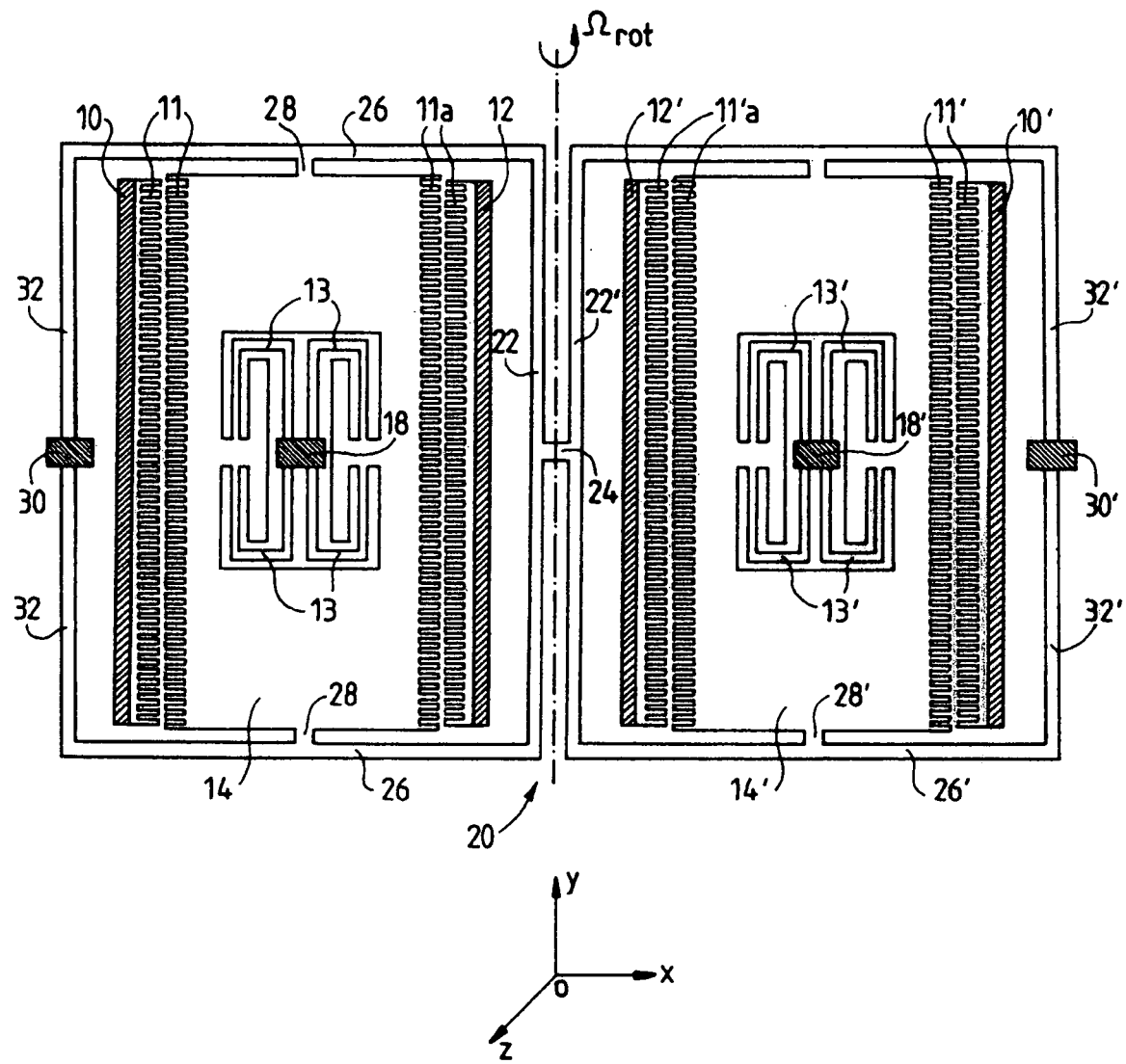
FIG. 3 shows an alternative embodiment of the invention with an anchoring point for the coupling structure.

FIG. 3 shows an alternative embodiment of the invention, in which the coupling structure 20 is fastened to an anchoring base, and in practice to two anchoring bases 30 and 30' that are symmetrical with respect to the sensitive axis. The anchoring bases have the advantage of making it easier for the moving masses to undergo a vertical translational movement, eliminating any partial rotation effect due to the fact that the masses move in phase opposition with respect to the plane of the figure, that is to say that one rises above the plane of the figure while the other one falls. This phase opposition is in fact generated by the fact that the masses are excited in phase by the interdigitated combs 11, 11' (that is to say one of the masses is drawn to the right while the other is drawn to the left, since the combs exert simultaneously an attractive force each on its side). Furthermore, this phase opposition of the vibration of the masses perpendicular to the plane is desirable since it allows detection to be made directly in differential mode, eliminating any common mode effects that would be caused if the masses were to move simultaneously on one and the same side of the plane of the structure.

However, it will be noted that the anchoring bases have a drawback in that some of the mechanical vibration energy from a mass is transmitted to (and consequently lost in) the anchoring base instead of being transmitted to the other mass.

Preferably, the anchoring bases 30 and 30' lie along the transverse axis of symmetry A3 and are located at points remote from the sensitive axis; these points are preferably away from the excitation combs 11, 11'. To do this, the coupling structure is formed as in FIG. 2, but the transverse arms 26 extend beyond the longitudinal arms 28 and encircle the moving masses via an additional longitudinal link 32 (32' in the case of the other moving mass), which runs along the moving mass on the opposite side from the sensitive axis. The coupling structure, symmetrical with respect to the sensitive axis, therefore completely frames each moving mass and the link between the two symmetrical portions of this structure is made, as in FIG. 2, by a short transverse link 24 between the longitudinal links 22 and 22'.

The anchoring point 30, 30' is located at the middle of the additional longitudinal link 32, 32'.

The link via arms 28, between the arms 26 and the moving mass, is located on the longitudinal axis of symmetry of the mass. The stiffness of the arms 22 and 32 of the coupling structure is low compared with the stiffness of the flexure arms 13 that support the mass, so that the main resonant frequency of the mass is determined much more by the stiffness of the arms 13 than the stiffness of the coupling structure, thus avoiding any distortion. Here again, it will be recalled that the main resonant frequency is the natural vibrational frequency of the mass, as close as possible to which frequency an artificial vibration is generated electrostatically.

Figure 4:
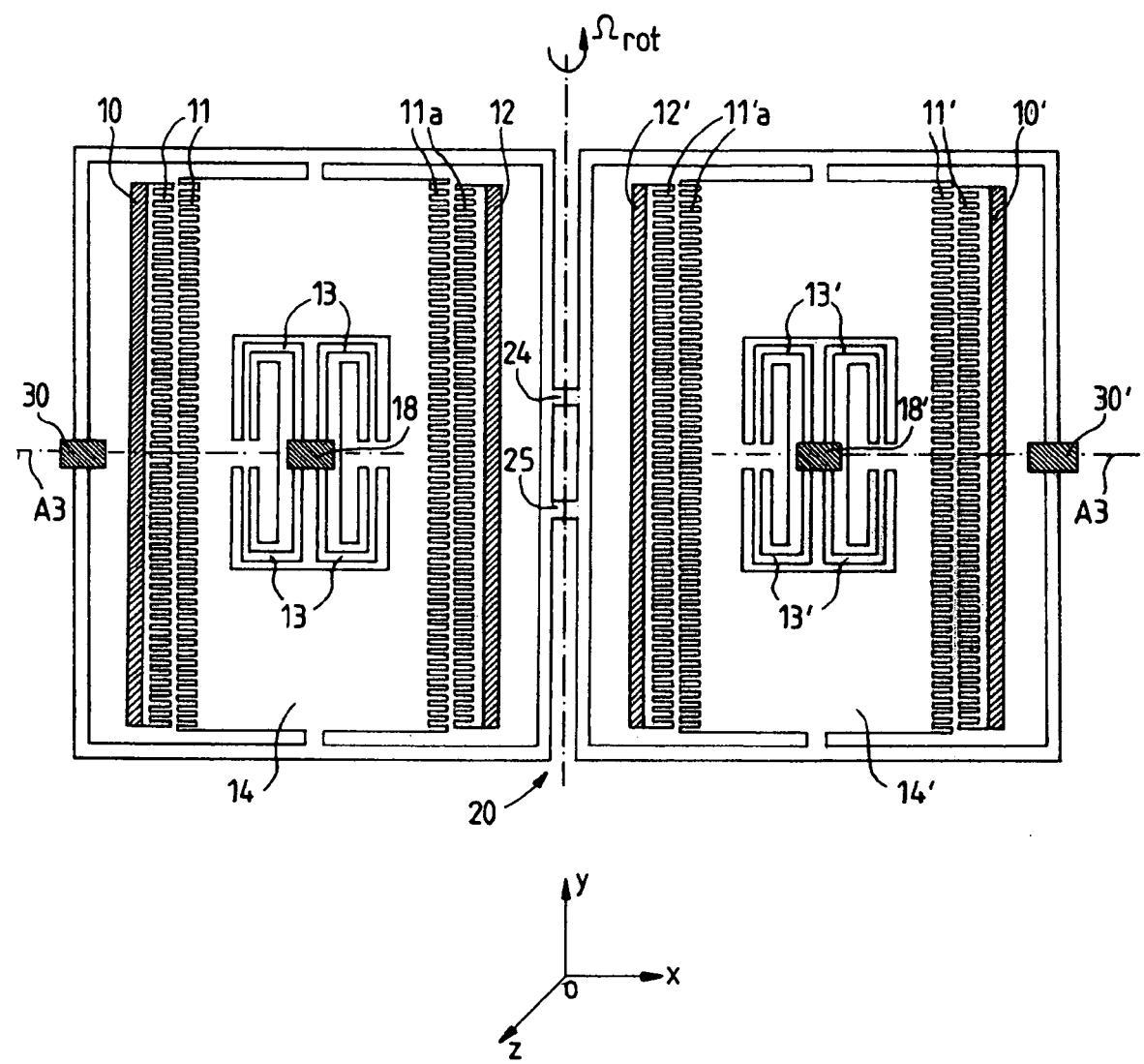
FIG. 4 shows another alternative embodiment, in which there is a particular link between the two halves of the coupling structure.

FIG. 4 shows an alternative embodiment of the linkage between the two symmetrical portions of the coupling structure. There are two short links 24 and 25 instead of a single one, these being close together, between the symmetrical portions. These links are symmetrical with respect to the transverse axis A2 if the remainder of the vibrating structure is symmetrical with respect to this axis. The distance between these short links is chosen in order for the control of the mechanical resonance frequency of the filter to be optimized.

This particular arrangement may be used independently of the fact that the coupling structure may or may not be anchored to bases 30.

Figure 5:
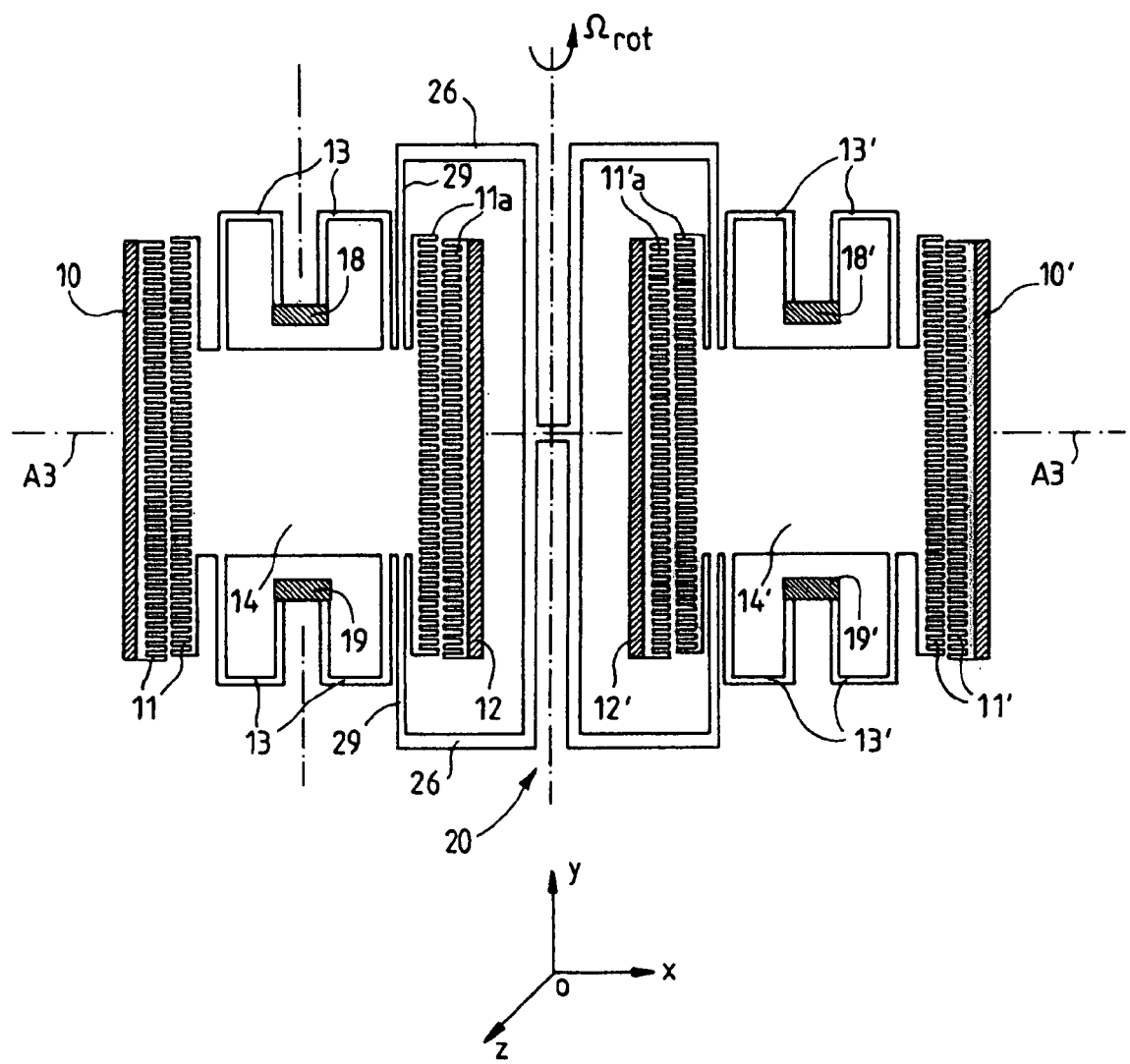
FIG. 5 shows an alternative embodiment in which the flexure arms are located around the moving masses and not within the perimeter of the latter.

FIG. 5 shows another alternative embodiment of the flexure arms 13. As in the other figures, the flexure arms are located between the moving masses and an anchoring base, and not between the moving masses and the coupling structure 20.

The difference is that these flexure arms are not located within the perimeter of the moving mass, but to the outside, and more particularly in this case on either side of the transverse axis of symmetry A3. There is then an anchoring base 18 for the two arms 13 that are located above the axis A3 and one anchoring base 19 for the two arms located below this axis. The anchoring bases lie outside the perimeter of the mass.

The coupling structure is attached to the moving mass no longer along a longitudinal axis of symmetry, such as the axis A2 of the preceding figures, because the anchoring base 18 or 19 prevents them from being fastened at this point, but laterally, alongside the point where the flexure arm is fastened to the moving mass.

In the example of FIG. 5, provision is made for the coupling structure to be fastened by a longitudinal arm 29, which runs along one branch of a U-shaped flexure arm, on one side of said branch (in this case, on the side closest to the sensitive axis).

Provision could also be made for the coupling structure to be fastened to one side of the moving mass not by a single arm 29 attached to a transverse arm 26, but by two arms 29 extending from a transverse arm 26 which is extended toward the outside; the two arms 29 would then flank the group of two flexure arms that is attached to the anchoring base 18 (or 19) and would be attached to the mass on either side of these flexure arms.

This alternative embodiment is compatible with the arrangement shown in FIG. 3 (showing anchoring bases for the coupling structure); in this case, the transverse arms 26 would extend as far as the outside of the structure and longitudinal arms 32 would then connect them to the anchoring base 30. It is also compatible with the arrangement shown in FIG. 4 (a double link 24, 25 between the two symmetrical portions of the coupling structure).

Figure 6:
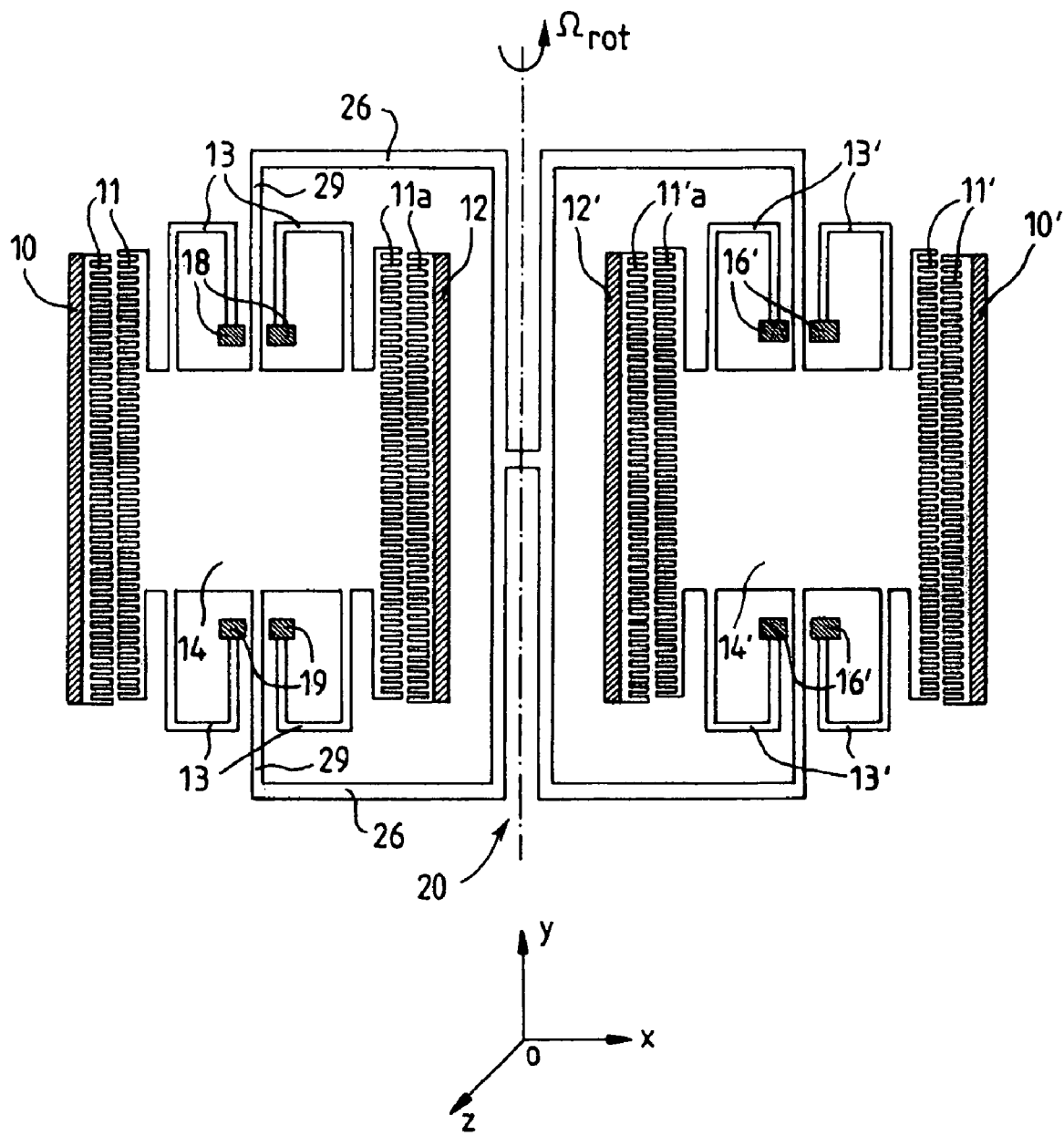
FIG. 6 shows an alternative embodiment with four anchoring points for four flexure arms.

Finally, FIG. 6 shows an alternative embodiment the inspiration of which is FIG. 5 (flexure arm 13 to the outside of the moving mass and not at the center thereof). For allowing connection between the moving mass and a transverse arm 26 of the coupling structure via a single longitudinal arm 29 passing, however, through the center of gravity of the moving mass, the anchoring base 18 is divided into two separate bases by a space; the same applies to the base 19. The arms 29 can then pass between these two bases. Here again, this alternative embodiment is compatible with the embodiments shown in FIGS. 3 and 4. It is more advantageous than that shown in FIG. 5 because the coupling structure is coupled to the mass along the longitudinal axis of symmetry of said structure (the axis A2 in FIG. 2).

Thus, various embodiments have been described that are based on the principle of the invention. In each of its embodiments, it may be seen that there is no longer a requirement for the torsion arms 17 that would be necessary in an embodiment such as that shown in FIG. 1. The movements of the moving masses (which are movements detected capacitively by facing electrodes on one moving mass and on a fixed substrate) are movements that are practically purely translational and are not composed of a rotational movement and a translational movement. The electrical servocontrol mechanisms are correspondingly easier when such a servocontrol is provided.

Finally, these structures are consequently very suitable for maintaining the closest possible spacing over the entire surface of the moving mass, between the electrode of this mass and the facing electrode on a fixed substrate of the gyroscope.

The invention claimed is:

1. A micromachined gyroscope having a plane moving structure anchored to a fixed substrate, the moving structure being symmetrical about a first axis which is the sensitive axis, lying in this plane, the gyroscope comprising:

two moving masses, each attached to four U-shaped flexure arms, the stiffness of which defines the main resonant frequency of the mass, the flexure arms of each moving mass being placed symmetrically with respect to a respective second axis which is parallel to the sensitive axis and which is an axis of symmetry of said moving mass, and a combination of said mass and flexure arms having a symmetrical configuration with respect to a third axis perpendicular to the first axis;

a structure for exciting the vibration of each mass in the plane of the structure;

a structure for detecting a vibration of the masses transverse to the plane; and a mechanical coupling structure for connecting the masses together, ensuring that mechanical vibration energy is transferred from one mass to the other;

wherein the flexure arms attached to each moving mass are directly attached also to a fixed anchoring point, the coupling structure being attached directly to the moving masses independently of the flexure arms and this coupling structure having a stiffness that is appreciably different from the stiffness of the flexure arms so that the main resonant frequency of the masses depends only slightly on the stiffness of the coupling structure, and wherein the anchoring point of the moving mass is located at a center of symmetry of the moving mass, at the intersection of the second and third axes.

2. The gyroscope as claimed in claim 1, wherein the coupling structure is attached to the moving mass at only two points that lie along an axis of longitudinal symmetry of the moving mass parallel to the sensitive axis.

3. A micromachined gyroscope having a plane moving structure anchored to a fixed substrate, the moving structure being symmetrical about a first axis which is the sensitive axis, lying in this plane, the gyroscope comprising:

two moving masses, each attached to four U-shaped flexure arms, the stiffness of which defines the main resonant frequency of the mass, the flexure arms of each moving mass being placed symmetrically with respect to a respective second axis which is parallel to the sensitive axis and which is an axis of symmetry of said moving mass, and a combination of said mass and flexure arms having a symmetrical configuration with respect to a third axis perpendicular to the first axis;

a structure for exciting the vibration of each mass in the plane of the structure;

a structure for detecting a vibration of the masses transverse to the plane; and a mechanical coupling structure for connecting the masses together, ensuring that mechanical vibration energy is transferred from one mass to the other;

wherein the flexure arms attached to each moving mass are directly attached also to fixed anchoring points, the coupling structure being attached directly to the moving masses independently of the flexure arms and this coupling structure having a stiffness that is appreciably different from the stiffness of the flexure arms so that the main resonant frequency of the masses depends only slightly on the stiffness of the coupling structure, and wherein each moving mass is connected via two flexure arms to a first of said anchoring points and via two other flexure arms to a second of said anchoring points, symmetrical with the first anchoring point with respect to the third axis, the two anchoring points being located on either side of the moving mass.

4. The gyroscope as claimed in claim 3, wherein the coupling structure is attached to the moving mass at only two points that lie along an axis of longitudinal symmetry of the moving mass parallel to the sensitive axis.

5. A micromachined gyroscope having a plane moving structure anchored to a fixed substrate, the moving structure being symmetrical about a first axis which is the sensitive axis, lying in this plane, the gyroscope comprising:

two moving masses, each attached to four U-shaped flexure arms, the stiffness of which defines the main resonant frequency of the mass, the flexure arms of each moving mass being placed symmetrically with respect to a respective second axis which is parallel to the sensitive axis and which is an axis of symmetry of said moving mass, and a combination of said mass and flexure arms having a symmetrical configuration with respect to a third axis perpendicular to the first axis;

a structure for exciting the vibration of each mass in the plane of the structure;

a structure for detecting a vibration of the masses transverse to the plane; and a mechanical coupling structure for connecting the masses together, ensuring that mechanical vibration energy is transferred from one mass to the other;

wherein the flexure arms attached to each moving mass are directly attached also to fixed anchoring points, the coupling, structure being attached directly to the moving masses independently of the flexure arms and this coupling structure having a stiffness that is appreciably different from the stiffness of the flexure arms so that the main resonant frequency of the masses depends only slightly on the stiffness of the coupling structure, and wherein each moving mass is connected via the four flexure arms to four anchoring points arranged in a symmetrical configuration with respect to a center of gravity of the moving mass.

6. The gyroscope as claimed in claim 5, wherein the coupling structure is attached to the moving mass at only two points that lie along an axis of longitudinal symmetry of the moving mass parallel to the sensitive axis.

7. A micromachined gyroscope having a plane moving structure anchored to a fixed substrate, the moving structure being symmetrical about a first axis which is the sensitive axis, lying in this plane, the gyroscope comprising:

two moving masses, each attached to four U-shaped flexure arms, the stiffness of which defines the main resonant frequency of the mass, the flexure arms of each moving mass being placed symmetrically with respect to a respective second axis which is parallel to the sensitive axis and which is an axis of symmetry of said moving mass, and a combination of said mass and flexure arms having a symmetrical configuration with respect to a third axis perpendicular to the first axis;

a structure for exciting the vibration of each mass in the plane of the structure;

a structure for detecting a vibration of the masses transverse to the plane; and a mechanical coupling structure for connecting the masses together, ensuring that mechanical vibration energy is transferred from one mass to the other;

wherein the flexure arms attached to each moving mass are directly attached also to at least one fixed anchoring point, the coupling structure being attached directly to the moving masses independently of the flexure arms and this coupling structure having a stiffness that is appreciably different from the stiffness of the flexure arms so that the main resonant frequency of the masses depends only slightly on the stiffness of the coupling structure, and wherein the coupling structure connecting the two moving masses has at least two longitudinal links extending on either side of the sensitive axis, parallel to the latter, between the moving masses, at least one transverse link connecting the two longitudinal links, and at least two transverse arms connecting each moving mass to a respective longitudinal link, the latter two transverse arms being located on either side of the moving mass and being connected to the moving mass, the transverse link connecting the two longitudinal links being placed along the third axis of symmetry, perpendicular to the sensitive axis, of the moving masses.

8. The gyroscope as claimed in claim 7 wherein the coupling structure includes, for each moving mass, two longitudinal arms parallel to the first axis, which arms are located on either side of the moving mass and connect a respective transverse arm to the moving mass.

9. The gyroscope as claimed in claim 8, wherein the two longitudinal arms are connected to the moving mass on either side of the latter at two points located on an axis of symmetry of the moving mass, parallel to the first axis.

10. The gyroscope as claimed in claim 7 wherein the coupling structure is connected to at least one additional respective anchoring point associated with each moving mass, this anchoring point being located on die other side of the moving mass relative to the first axis, the transverse arms being connected to this anchoring point via other respective longitudinal links.

11. The gyroscope as claimed in claim 7, wherein each moving mass is connected via four flexure arms to four anchoring points arranged in a symmetrical configuration with respect to a center of gravity of the moving mass and wherein the longitudinal arms each pass between two respective anchoring points taken from the four anchoring points.

* * * * *